United States Patent [19]

Nakamura

[11] Patent Number: 4,722,788

[45] Date of Patent: Feb. 2, 1988

[54] MAGNETIC FILTER

[75] Inventor: Michishige Nakamura, Tokyo, Japan

[73] Assignee: Ishikawajima-Harima Jukogyo Kabushiki Kaisha, Tokyo, Japan

[21] Appl. No.: 813,147

[22] Filed: Dec. 24, 1985

[30] Foreign Application Priority Data

May 25, 1985 [JP] Japan .................................. 60-112892
May 25, 1985 [JP] Japan .................................. 60-112893

[51] Int. Cl.⁴ ........................ B01D 35/06; B03C 1/02; C02F 1/48
[52] U.S. Cl. .................................. 210/222; 210/391; 210/411
[58] Field of Search ............... 210/222, 223, 270, 695, 210/391, 409, 410, 411; 209/223 R, 232

[56] References Cited

U.S. PATENT DOCUMENTS 243,233  6/1881  Farquhar et al. ................... 210/270

FOREIGN PATENT DOCUMENTS

53210    6/1983  Japan .
82116    5/1985  Japan .................... 210/223
850233  10/1960  United Kingdom ............... 210/222
2035143  6/1980  United Kingdom ............... 201/222

Primary Examiner—Richard V. Fisher
Assistant Examiner—W. Gary Jones

[57] ABSTRACT

A magnetic filter comprises a vessel, a screen main body disposed within the vessel for partitioning the vessel into an upper chamber and a lower chamber, a filtration layer formed by particle-like filter elements magnetized by magnets and disposed on the screen main body. Corrosion products entrained in a liquid charged into the upper chamber are removed by the filtration layer.

3 Claims, 14 Drawing Figures

MAGNETIC FILTER

BACKGROUND OF THE INVENTION

The present invention relates to a magnetic filter for removing cruds in a liquid by filter layers formed by magnetizing filter elements by magnets.

Iron and steel structures such as various vessels and pipes used in nuclear power plants and heat power plants undergo gradual corrosion due to contact with a liquid such as water and corrosion products such as iron oxide particles ($Fe_2O_3$, $Fe_3O_4$ and so on) (to be referred to as "cruds" in this specification) are produced. As a result, there occurs a phenomenon that the bore of a pipe is gradually clogged or narrowed.

Figure 1:
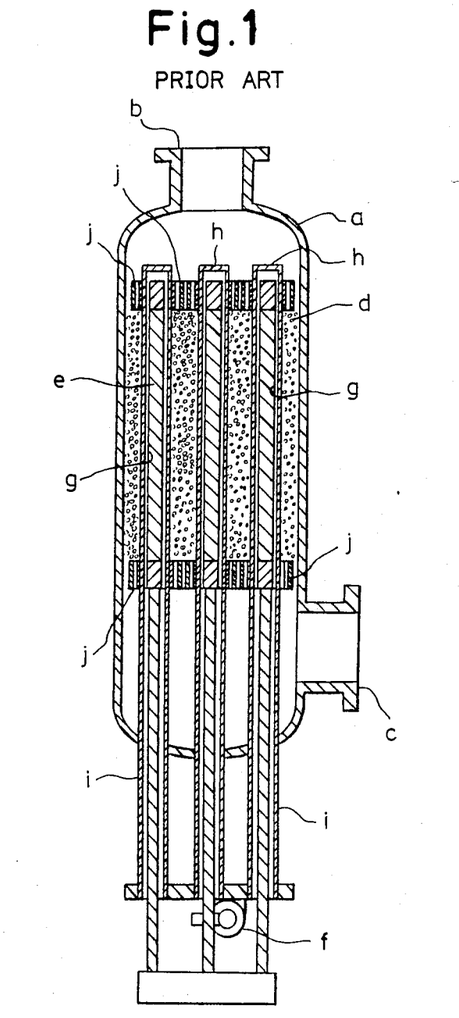
FIG. 1 is a vertical sectional view of a prior art magnetic filter.
Figure 2:
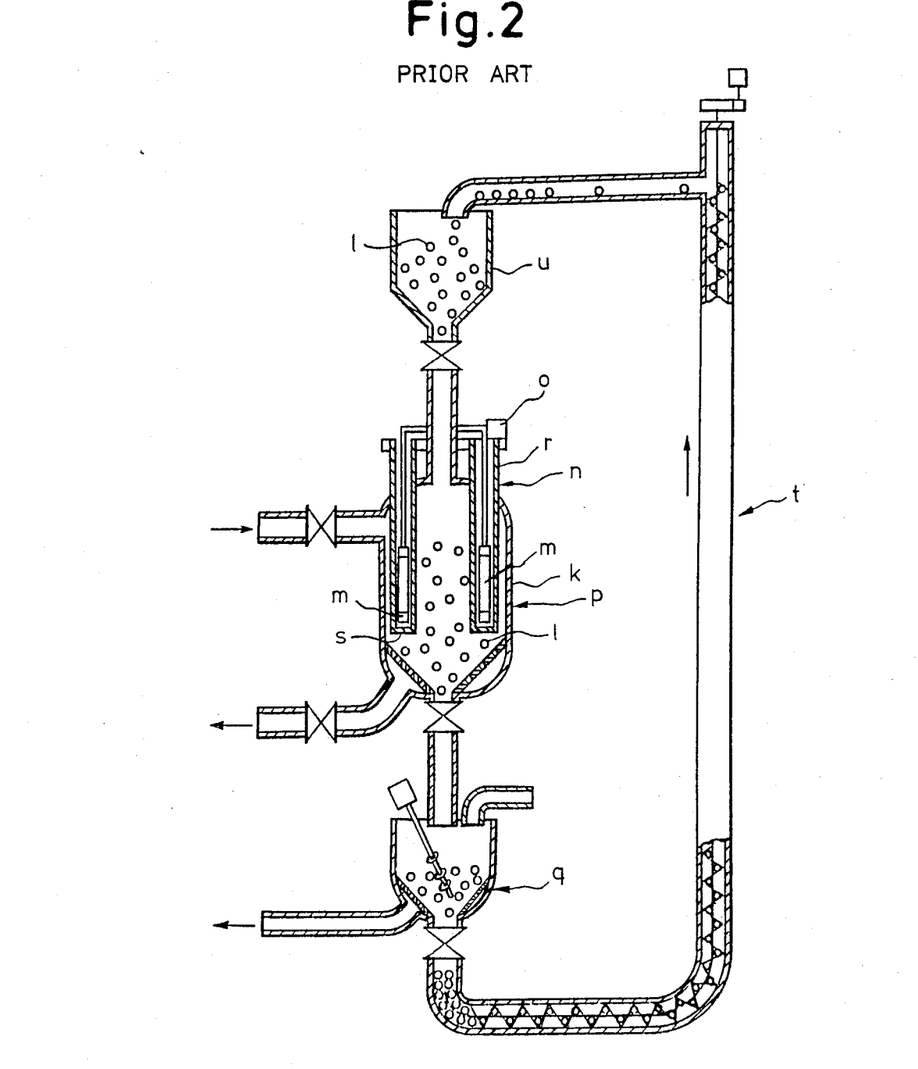
FIG. 2 is also a vertical sectional view of another prior art magnetic filter.

Magnetic filters for instance of the types as shown in FIGS. 1 and 2 have been used to remove such cruds.

FIG. 1 shows a magnetic filter for removing cruds which has been proposed by the same inventor (Japanese Utility Model Application laid open under No. 53210/1983). In this magnetic filter, inner pipes g partially and liquid-tightly extend through a vessel a having an inlet b and an outlet c. The inner pipes g are closed at their upper ends as indicated by h. Filter elements d made of ferromagnetic materials are in the space in the vessel a except the inner pipes g and permanent magnets e are vertically movably inserted into the respective inner pipes g. The inner pipes g are made of non magnetic material while the plugs h closing the upper ends of the inner pipes g are made of a ferromagnetic material. A guide i which is a lower portion of each inner pipe g is made of a ferromagnetic material and is formed integral with the inner pipe g. The filter elements d are packed in the space which is defined around the pipes g by a pair of vertically spaced yoke baffle plates j, in such a way that the movements of the filter elements d are so restricted that they are not permitted to flow through the passage openings of the yoke baffle plates j. Upon energization of a drive device f, the permanent magnets e are displaced in the pipes g above the guides i, so that the filter elements d are magnetized. Under these conditions, a liquid to be treated from a nuclear power plant is charged through the inlet b into the vessel a so that the cruds are attracted by the filter elements d.

In order to remove the cruds attracted by the filter elements d, the drive device f is activated so as to lower the permanent magnets e into the guides i. After the filter elements d have been de magnetized in that manner, cleaning water is charged through the outlet c into the vessel a so as to remove the cruds from the filter elements. The removed cruds are discharged together with the cleaning water through the inlet b out of the vessel a.

In the magnetic filter of the type described above, the layer of filter elements must become dense when magnetized and must be loosened when the cruds are washed. Since the filter elements d are packed only in the spaces between the yoke baffle plates j, there arises the problem that the filtration or cleaning efficiency is low. Furthermore, there is the problem that the direct contact between the permanent magnet e and the ferromagnetic guide i results in contact de magnetization so that the magnetic force is gradually decreased.

FIG. 2 shows another magnetic filter for removing cruds which was also proposed by the same inventor (Japanese Patent Application laid open under No. 96293/1983). This magnetic filter comprises a vessel k through which flows a liquid containing cruds; magnet insertion pipes n which extend liquid tightly downwardly from the top of the vessel k; vertically movable permanent magnets m in the pipes n; a drive device o for vertically moving the permanent magnets m; a filter body p packed with filter elements 1 adapted, when magnetized, to magnetically catch the cruds entrained in the liquid; and a cleaning vessel q for cleaning the filter elements 1 removed out of the filter main body p. The pipe n comprises a pressure resisting guide r and a pressure resisting lower portion s both of which are made of a ferromagnetic stainless steel. When the permanent magnet m is inserted into its lowermost position, the magnetization of the filter elements 1 is effected by the upper and lower magnetic poles.

The filter elements 1 are charged into the vessel k and the drive device o is activated so that the permanent magnet m is inserted into the pressure-resisting portion of the pipe n, whereby the filter elements 1 are magnetized. Under these conditions, a liquid to be treated such as the water from a nuclear power plant is charged into the vessel k so that the cruds are attracted and caught by the filter elements 1 of the filter main body p.

In order to remove the cruds which are attracted and caught by the filter elements 1, the liquid as well as the filter elements 1 are discharged out of the vessel k into the cleaning vessel q. The cruds are removed when the filter elements 1 are cleaned and the filter elements 1 free from the cruds are moved into a hopper u by means of a conveyor t and are charged again into the vessel k.

In the case of the magnetic filter of the type described just above, the filter elements 1 must be packed not only around the permanent magnets m but also into the filter main body p which occupies a substantial volume of the vessel k. As a result, a large quantity of filter elements 1 are required and consequently there arises the problem that the pressure loss is increased during the filtration cycle because of the packed filter elements 1. Furthermore, since the pressure resisting guide r is made of a ferromagnetic material, the contact demagnetization results because of the direct contact of the permanent magnet m with the ferromagnetic component part. As a result, the magnetic force is gradually decreased.

The present invention was made to overcome the above and other problems encountered in the prior art magnetic filters and contemplates to attain the following objects:

(1) to increase the efficiency for attracting and catching cruds by increasing the density of the filter layer when the filter elements are magnetized;

(2) to increase the efficiency for cleaning the filter elements by dispersing and fluidizing the filter elements by decreasing the density of the filter layer when the filter elements are de-magnetized;

(3) to ensure the streamlining action when a liquid to be treated is supplied and to ensure the prevention of the filter elements from being dispersed when they are being cleaned;

(4) to minimize the pressure loss by decreasing the quantity of filter elements;

(5) to ensure the positive de-magnetization of filter elements when they are discharged; and (6) to increase a useful life of a permanent magnet by preventing the contact de-magnetization caused when the permanent magnet is vertically moved.

The above and other objects, effects, features and advantages of the present invention will become more apparent from the following description of preferred embodiments thereof taken in conjunction with the accompanying drawings.

DETAILED DESCRIPTION OF THE PREFERRED EMBODIMENTS

First Embodiment, FIGS. 3–7

Figure 3:
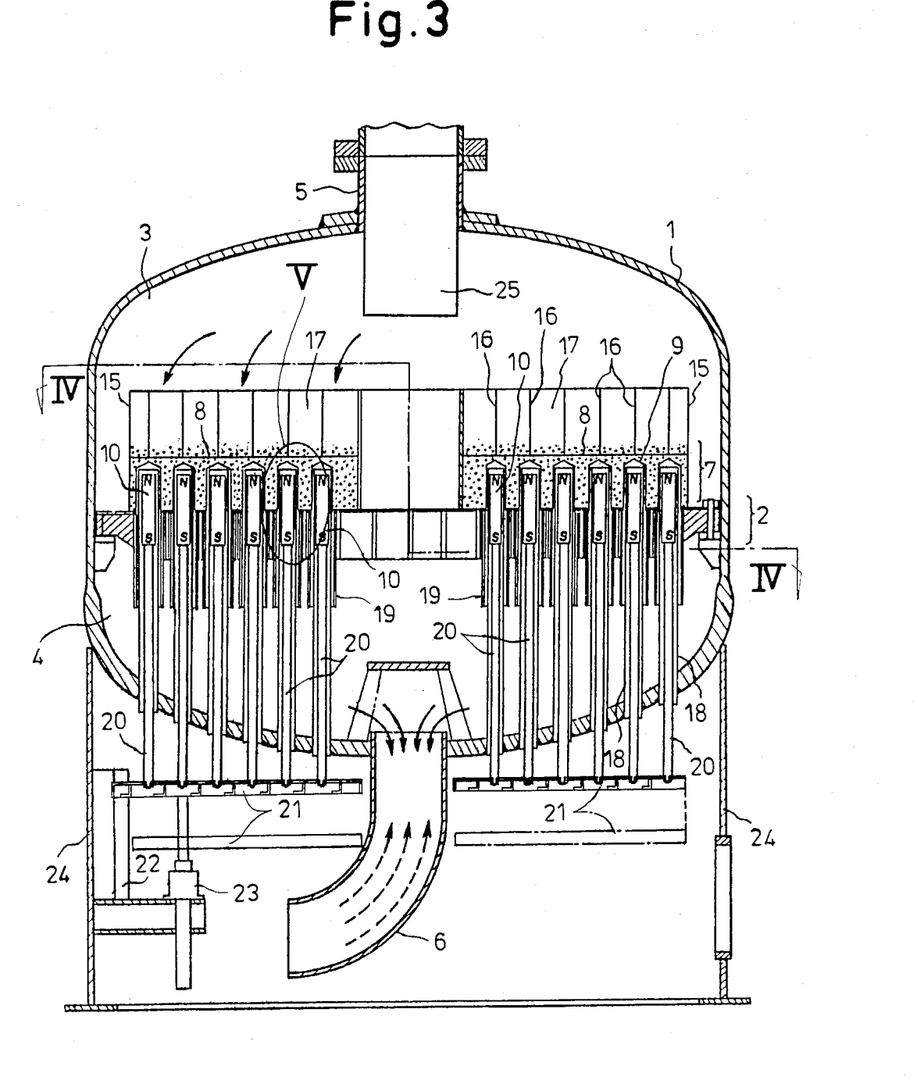
FIG. 3 is a vertical sectional view of a first embodiment of a magnetic filter in accordance with the present invention.

Referring first to FIG. 3, a vessel 1 is partitioned by a screen main body 2 into an upper chamber 3 and a lower chamber 4 and has a liquid inlet 5 through which a liquid to be treated is charged into the vessel 1 and a liquid outlet 6 through which the treated liquid is discharged out of the vessel 1. Filter elements 8 which form a filter layer 7 upon magnetization are laid over the screen main body 2 such that they are free to move upward. Caps 9 made of a non-magnetic material liquid-tightly extend upwardly through the screen main body 2. A permanent magnet 10 is vertically movable into and out of each cap 9. When the permanent magnet 10 is inserted into the cap 9, the filter elements 8 are magnetized; when the permanent magnet 10 is moved out of the cap 9, the filter elements 8 are de-magnetized.

Figure 4:
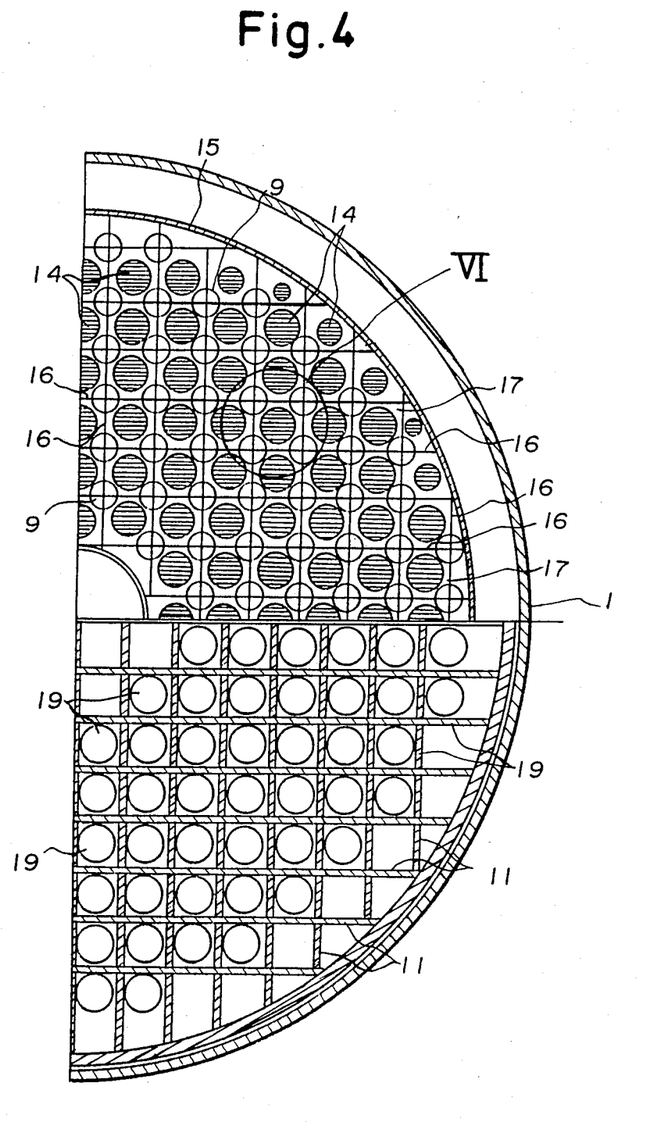
FIG. 4 is a sectional view taken along the line IV—IV of FIG. 3, some parts being not shown.
Figure 5:
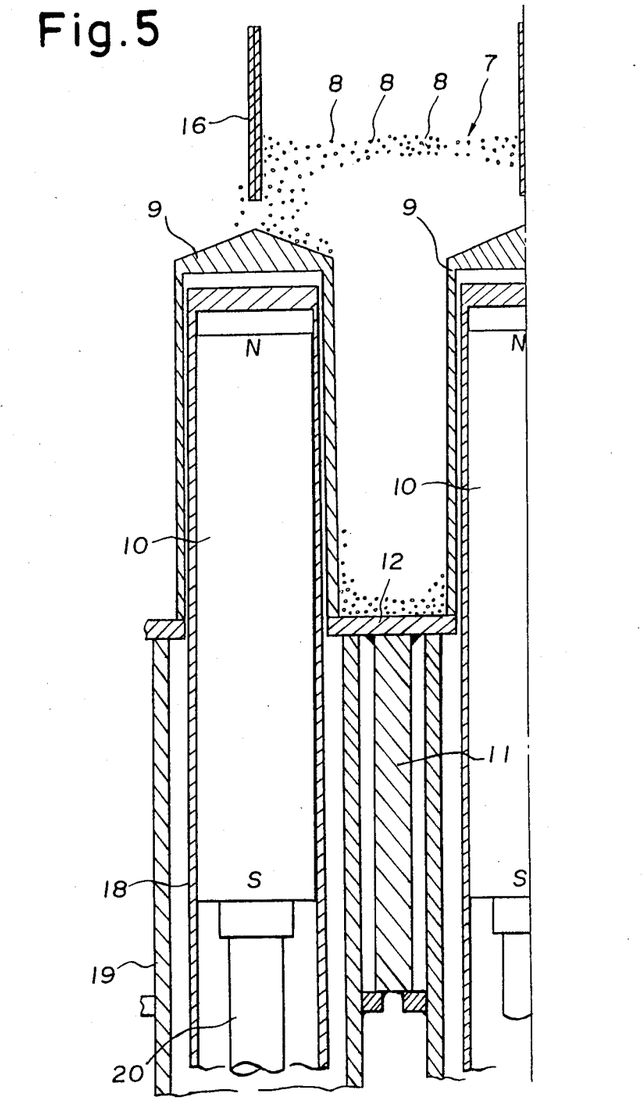
FIG. 5 is a view, on enlarged scale, of a portion indicated by the oval V in FIG. 3.
Figure 6:
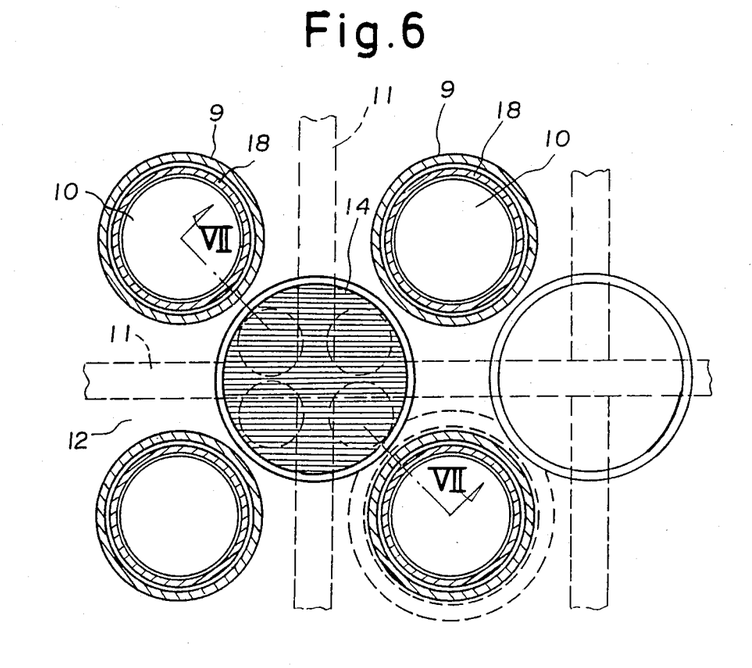
FIG. 6 is a partial view, on enlarged scale, of a portion indicated by the circle VI in FIG. 4.
Figure 7:
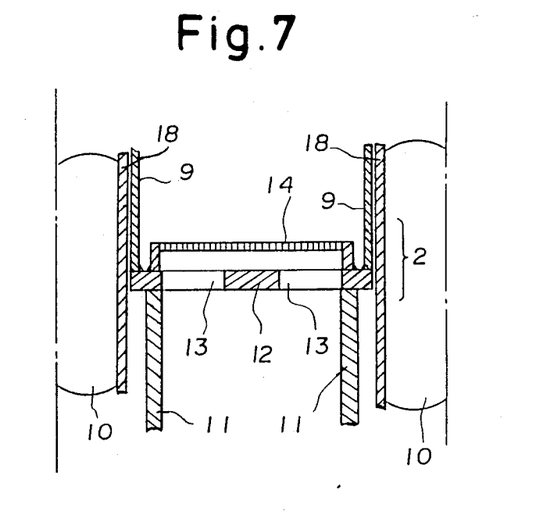
FIG. 7 is a partial sectional view taken along the line VII—VII of FIG. 6.

The screen main body 2 extends horizontally in the vessel 1 and comprises a grid 11 through which the permanent magnets 10 are vertically movable, a separation plate 12 which is laid over the grid 11 and is adapted to separate the caps 9 from each other and a screen plate 14 disposed above the separation plate 12 so as to cover four openings formed through the separation plate 12. The screen plate 14 has slits or meshes which do not permit the passage of the filter elements 8 (of, for instance, 0.5–2 mm in particle size). As best shown in FIGS. 4 and 6, each screen plate 14 is disposed at the center of four caps 9.

Partition walls 16 are disposed above the filter layer 7 and divide the space defined by a ring-shaped side wall 15 into a plurality of sections. The partition walls 16 divide the space above the caps 9 in the form of interconnected squares and defines vertical insertion passages 17 which are in vertically opposed relationship with the screen plates 14.

Disposed below the cap 9 are a guide tube 18 which is made of a non-magnetic material and which surrounds the permanent magnet 10 and a housing 19 which is made of a ferromagnetic material and which surrounds the guide tube 18 so as to establish a magnetic path. As best shown in FIG. 3, the guide tubes 18 extend downwardly through the bottom of the vessel 1 and serve to liquid-tightly separate the permanent magnets 10 from the interior of the vessel 1 and to allow the vertical movement of the permanent magnets 10. More specifically, a rod 20 integrally formed with the permanent magnet 10 extends downwardly through the bottom of the vessel 1 and is securely joined to a lift device 21. The lift device 21 is vertically movable along a guide 22 by a drive device 23 such as a worm Jack to vertically move the permanent magnets 10.

The vessel 1 is supported by a skirt 24. An upper screen 25 is attached to the liquid inlet 5 and has a mesh which does not permit the passage of the filter elements 8 as in the case of the screen plates 14.

In the magnetic filter with the above-described construction, the filter elements 8 are filled over the caps 9 as shown in FIG. 3. When the drive device 23 is activated and the permanent magnets 10 are inserted into the caps 9, the magnetic paths of the permanent magnets 10 are established between the upper and lower layer portions of the filter elements 8 which are piled naturally and the space between the upper and lower layers is magnetized, thus forming the filter layer 7. In this case, as shown in FIG. 3, almost an upper half of the permanent magnet 10 or upper magnetic pole thereof is inserted into the filter layer 7 as shown in FIG. 3 while the lower magnetic pole of the permanent magnet 10 remains in the housing 19. As a result, the magnetic fields are produced between the upper magnetic poles of the permanent magnets 10 and the upper ends of the housings 19 so that the filter elements 8 in the filter layer 7 are magnetized.

In this case, because of the mutual magnetic attraction between the filter elements 8, the density of the filter layer 7 in the vertical direction becomes higher than that of the filter layer 7 which is naturally piled. Since the depth of the initially filled filter elements 8 exceeds the height of the caps 9 as shown in FIG. 3, the filter elements 8 are sequentially replenished from above the caps 9 to compensate for the compressed portion so that the density of the filter layer 7 around the caps 9 becomes uniform.

A liquid to be treated is charged into the filter layer 7 so that the cruds entrained in the liquid are attracted and trapped. More specifically, the liquid to be treated is charged through the liquid inlet 5 into the vessel 1 and is divided into a plurality of streams by the insertion passages 17 of the partition walls 16. These divided streams substantially uniformly pass through respective portions of the filter layer 7 so that the cruds are attracted and trapped by the filter elements 8. Thereafter they pass through the screen plates 14 and then into the lower chamber 4 and are directed toward the liquid outlet 6 as indicated by the arrows.

When the permanent magnets 10 are caused to move downwardly along the guide tubes 18 to their lowermost position, they are placed into their housings 19. As a result, the magnetic paths are established between the upper magnetic poles of the permanent magnets 10 and the side walls of the housings 19 so that the influence of leakage flux on the exterior is diminished and consequently the filter elements 8 can now freely move. Thereafter, a cleaning liquid is charged through the liquid outlet 6 into the vessel 1 as indicated by the broken line arrows in FIG. 3. Then, the filter elements 8 are fluidized and become thin while they are intermixed. As a result, the whole surfaces of the filter elements 8 are made into contact with the cleaning liquid so that the cruds are removed from the surfaces of the filter elements 8 and are discharged together with the cleaning liquid through the liquid inlet 5 out of the vessel 1. In such counter-flow type cleaning cycle, fluidization of the filter elements 8 causes the intermixing action mainly within the insertion passage 17 of the partition walls 16. Further fluidization of the filter elements 8 enhances the cleaning action to prevent the filter elements 8 from scattering into other regions. Upon completion of the counter-flow type cleaning cycle, the fluidized filter elements 8 sink and are naturally piled up. In this case, the filter elements 8 are downwardly guided by the insertion passages 17 of the partiton walls 16 to their initial positions so that the filter elements 8 are uniformly piled up and are prevented from being scattered.

It should be noted that even when the magnetic poles of the permanent magnets 10 are made into contact with the guide tubes 18 made of a non-magnetic material within the vertical stroke of the permanent magnets 10, the magnetic poles are kept out of contact with the ferromagnetic component parts so that the so-called contact de-magnetization can be prevented.

In the counter-flow type cleaning cycle, the upper screen 25 prevents the filter elements 8 from being discharged out of the vessel 1.

Second Embodiment, FIGS. 8–12(C)

Figure 8:
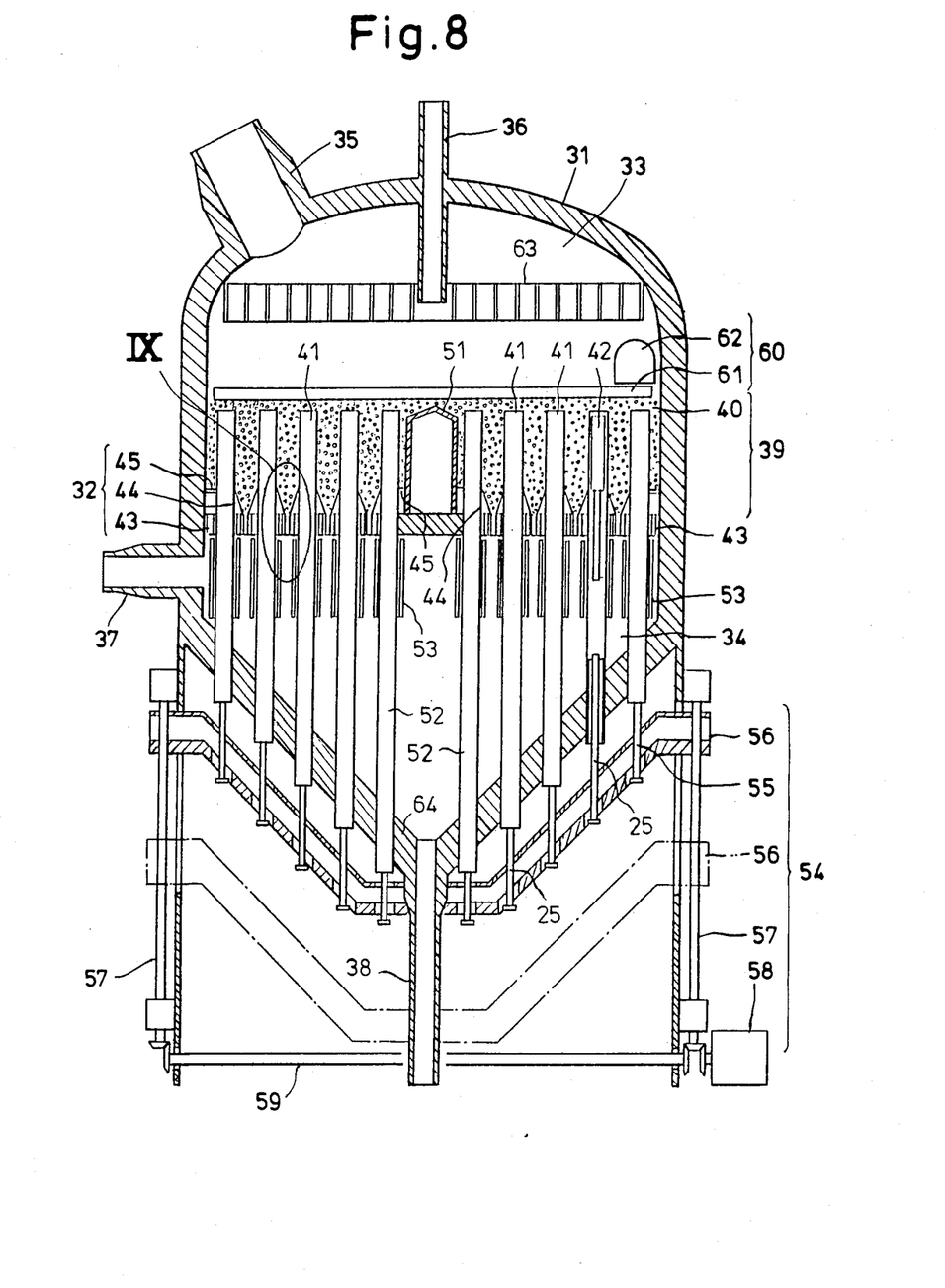
FIG. 8 is a vertical sectional view of a second embodiment of a magnetic filter in accordance with the present invention.

A second embodiment of a magnetic filter in accordance with the present invention is shown in FIGS. 8–12(C). Referring first to FIG. 8, a vessel 31 is partitioned by a screen main body 32 into an upper chamber 33 and a lower chamber 34. The upper chamber 33 has a liquid inlet 35 through which a liquid to be treated is charged into the vessel 31 and a filter-element supply inlet 36 while the lower chamber 34 has a liquid discharge outlet 37 through which the treated liquid is discharged and a filter-element outlet 38. Filter elements 40 which form a filter layer 39 upon magnetization as will be described in more detail hereinafter are piled upon the screen main body 32. Caps 41 made of a non-magnetic material extends upwardly through the screen main body 32. A permanent magnet 42 is vertically movable into and out of each cap 41. When the permanent magnet 42 is inserted into the cap 41, the filter elements 40 surrounding the cap 41 are magnetized; when the permanent magnet 42 is withdrawn out of the cap 41, the filter elements 40 are de-magnetized.

The screen main body 32 extends horizontally within the vessel 31 as shown in FIG. 8. The caps 41 extend upwardly through the screen main body 32. The screen main body 32 comprises a grid 43 made of a ferromagnetic material, screen nozzles 44 disposed on the grid 43 and packed with the filter elements 40 and partition plates 45 which liquid-tightly separate between the screen nozzles 44 and the caps 41.

Figure 9:
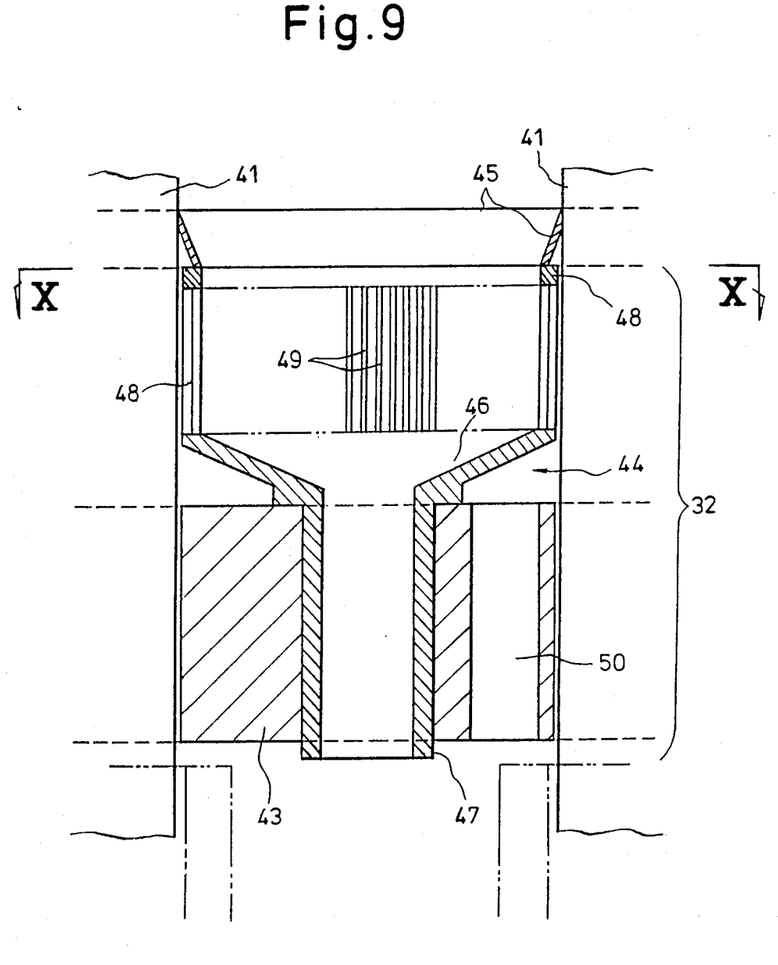
FIG. 9 is an enlarged view of a portion indicated by the oval IX in FIG. 8.
Figure 10:
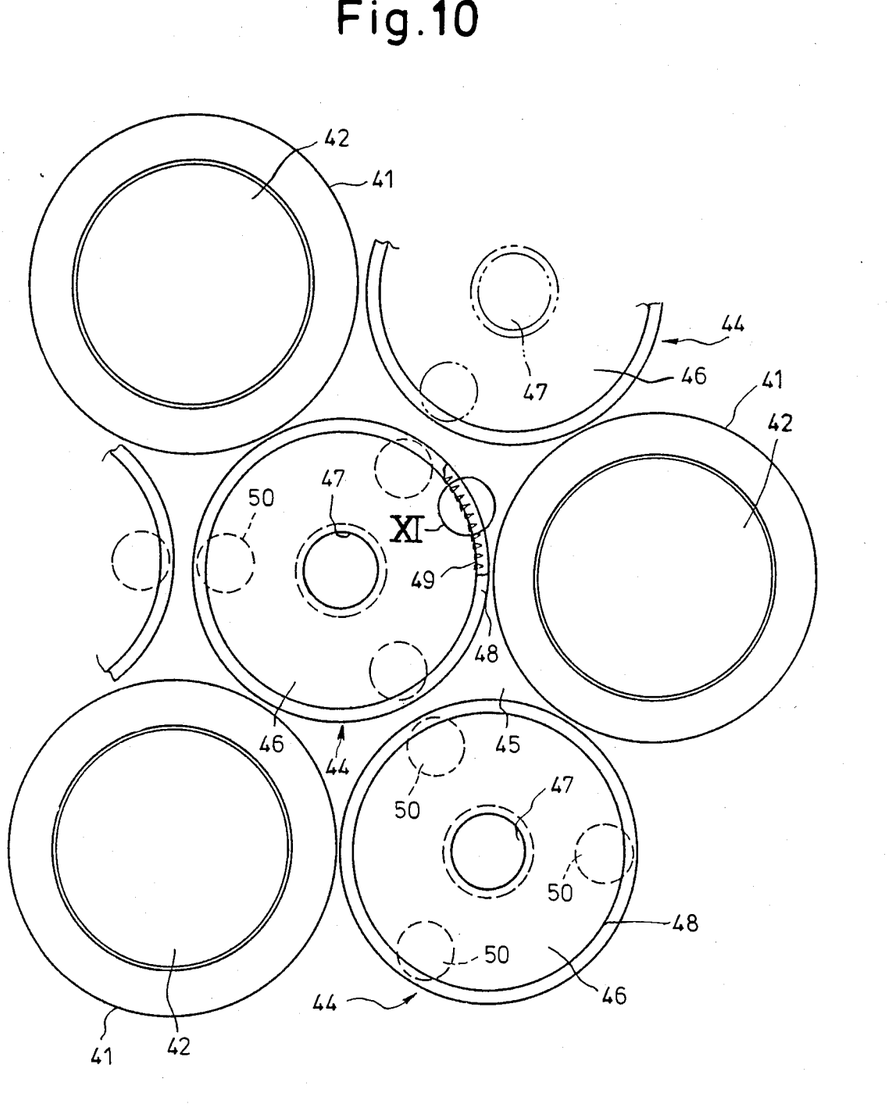
FIG. 10 is a partial sectional view taken along the line X—X of FIG. 9.
Figure 11:
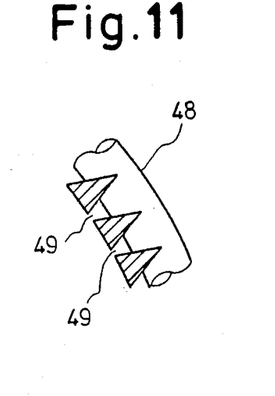
FIG. 11 is an enlarged view of a portion indicated by the circle XI in FIG. 10.

As shown in FIG. 9, the screen nozzle 44 has a filter-element insertion opening 47 extending downwardly from the lower end of a funnel-like portion 46. A side wall 48 of the screen nozzle 44 is formed with slits 49 in communication with the space below the grid 43; that is, the lower chamber 34. The size of the slits 49 is so selected as not to permit the passage of the filter elements 40. In this embodiment, the slits 49 are in the form of a wedge wire screen as shown in FIG. 10, but they may have any suitable configurations. Furthermore, instead of the slits 49, holes may be formed. The grid 43 shown in FIG. 9 has three through holes 50 for each screen nozzle 44. Preferably, the partition wall 45 is so inclined that its extension converges at the axis of the screen nozzle 44. A cap-shaped distribution cylinder 51 with a conical top is disposed at the center of the grid 43 immediately below the filter-element supply inlet 36.

A liquid-tight guide tube 52 made of a non-magnetic material is disposed below the screen nozzle 44 to communicate between the lower end of the cap 41 and the exterior of the vessel 31 and surrounds the permanent magnet 42. A housing 53 made of a ferromagnetic material surrounds the guide tube 52 so as to define the magnetic paths adjacent to the lower end of the screen nozzle 44 and the grid 43.

A drive device 54 is disposed to bring the permanent magnets 42 to one of a plurality of vertical positions. The drive device 54 comprises rods 55 extending downwardly from the lower ends of the permanent magnets 42 through the guide tubes 52 beyond the vessel 31, an elevator 56 to which are joined the lower ends of the rods 55, guides 57 for supporting the elevator 56 for vertical movement, a drive source 58 such as an electric motor for bringing the elevator 56 to one of a plurality of vertical positions and a power transmission mechanism 59 comprising a drive shaft interconnecting between the drive source 58 and the elevator 56, a reduction gear, gearing and so on.

A rake device 60 for making substantially flat the upper surface of the filter elements 40 piled over the screen main body 32 is disposed in the upper chamber 33 of the vessel 31. As shown in FIG. 8, the rake device 60 comprises a rod-like rake 61 which is disposed horizontally in the vessel 31 and is rotated in a horizontal plane and a rake driving mechanism 62 such as a hydraulic piston for rotating the rake 61 a plurality of times when the filter elements 40 are supplied.

A baffle plate assembly 63 is disposed below the liquid inlet 35 of the vessel 31 so that the jet stream of the liquid to be treated charged through the liquid inlet 35 can be weakened and the liquid to be treated can be uniformly distributed. A hopper 64 is disposed to direct the filter elements 40 to the filter-element outlet 38.

Figure 12A:
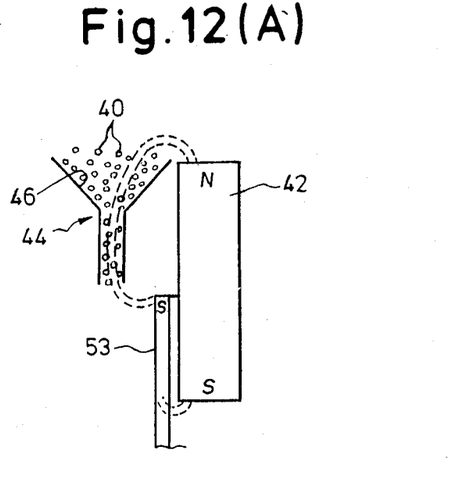
FIGS. 12(A), 12(B) and 12(C) are views used to explain the mode of operation of the magnetic filter shown in FIG. 8, FIG. 12(A) showing the filter elements initially charged, FIG. 12(B) showing a magnetized filter layer and FIG. 12(C) showing the discharge of the filter elements.

When the filter elements 40 are charged into the vessel 31, the drive device 54 is activated so that, as shown in FIG. 12(A), the permanent magnet 42 is raised to a position which is slightly higher than the lower portion of the screen main body 32 and is adjacent to the funnel shaped portion 46 of the screen nozzle 44. Then, the magnetic paths between the upper magnetic pole of the permanent magnet 42 on the one hand the upper end of the housing 53 and the grid 43 on the other hand are shortened so that a strong magnetic field is produced as indicated by the broken lines in FIG. 12(A). When the filter elements 40 are charged through the filter-element supply inlet 36 into the vessel 31 under these conditions, they flow over the conical top of the distribution tube 51 so that they are distributed and guided by the caps 41 and the partition plates 45 to the funnel-shaped portions 46 of the screen nozzles 44.

Then the magnetic fields magnetize them so that the filter elements 40 are attracted by each other and bridged. As a result, the passage of the magnetized filter elements 40 through the filter-element opening 47 is prohibited so that the filter elements 40 are trapped and held in the funnel-shaped portions 46. In this case, when the filter-element passages 47 of some screen nozzles 44 are clogged with the bridged filter elements 40, the filter elements 40 gradually pile up and flow toward the remaining screen nozzles 44 which are not closed. As a result, the filter-element passages 47 of the latter are gradually closed. When all the filter-element passages 47 are closed with the filter elements 40, the filter elements 40 naturally pile up on the screen main body 32.

Thereafter the rake device 60 is activated so that the rake 61 rotates horizontally a plurality of times. Then the filter elements 40 are supplied to the portions which are not sufficiently supplied with the filter elements 40 and the rough surface of the filter element layer is smoothed. As a result, a portion of the filtration layer 39 which is to be magnetized has a uniform depth. Therefore in the second embodiment, the filter elements 40 packed between the screen main body 32 and the rake device 60 are used as a filtration layer 39 so that filter elements required 40 is decreased in quantity.

Figure 12B:
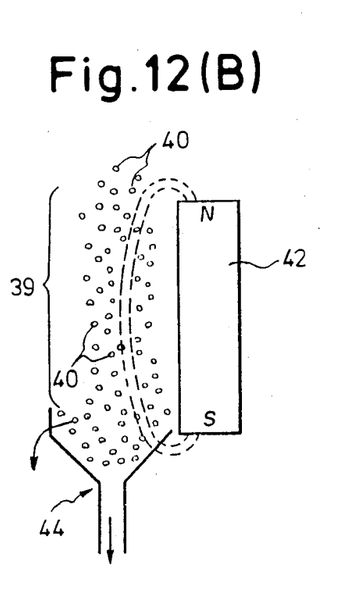

Magnetization of the filtration layer is carried out as follows. After the top surface of the filter element layer has been smoothed, the magnet drive device 54 is activated to raise the permanent magnet 42. When the lower magnetic pole of the permanent magnet 42 is aligned to the upper surface of the screen main body 32 as shown in FIG. 8 and FIG. 12(B), the magnetic field between the magnetic poles of the permanent magnet 42 extends through almost all of the filtration layer 39 to magnetize the filter elements 40. In this state, the filter elements 40 trapped in the funnel-shape portion 46 of the screen nozzle 44 are magnetized by the lower magnetic pole of the permanent magnet 42 so that the filter element passage 47 is kept closed. Furthermore, the magnetic filed produced between the magnetic poles of the permanent magnet 42 is vertically expanded as compared with the time when the filter elements 40 are initially charged.

In order to remove the cruds, a liquid to be treated is charged through the liquid inlet 35 into the vessel 31 under the condition that the filtration layer 39 is completely magnetized. Since the filtration layer 39 has a substantially uniform depth, there is no remarkable variation in the degree of magnetization of the filter elements 40 of the filtration layer 39. Therefore the cruds entrained in the liquid are trapped by almost all the region of the filtration layer 39 and the pressure loss becomes uniform. The liquid which is now free from the cruds flows through the slits 49 of the side wall 48 of the screen nozzle 44 and the filter element passage 47 into the lower chamber 34 as indicated in FIG. 12(B) and is discharged through the liquid outlet 37 of the vessel 31. Therefore, according to the second embodiment, the treated liquid is directed to the lower chamber 34 through a plurality of passages so that the pressure loss is minimized.

Figure 12C:
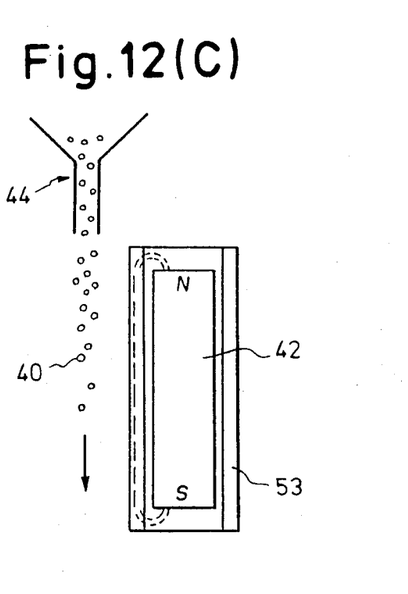

In the case of the discharge of the filter elements, the magnet drive device 54 is activated so that the permanent magnet 42 is moved downwardly to a position below the screen nozzle 44 as shown in FIG. 12(C); that is, into the housing 53. The magnetic field produced by the permanent magnet 42 is confined within the housing 53 as indicated by the broken lines in FIG. 12(C) so that the magnetic paths extend from the upper magnetic pole of the permanent magnet 42 through the cylindrical side wall of the housing 53 to the lower magnetic pole of the permanent magnet 42. As a result, the influence of the leakage flux on the exterior is decreased so that the filter elements 40 are de-magnetized and consequently they fall by their own weight into the hopper 64 as indicated by the arrow in FIG. 12(C) and then discharged through the filter-element outlet 38 out of the vessel 31.

As described with reference to FIG. 2, the discharged filter elements 40 are directed together with the treated liquid to the cleaning chamber as shown in FIG. 2. After the filter elements 40 have been cleaned, they are charged again into the vessel 31.

It should be noted that during the vertical stroke of the permanent magnet 42 their magnetic poles are surrounded by the guide tube 52 made of a non-magnetic material so that their contact with the ferromagnetic component part is completely prevented. As a result, the so-called contact de-magnetization can be avoided.

The effects, features and advantages of the magnetic filters in accordance with the present invention may be summerized as follows:

(I) The filter elements are subjected to a strong magnetic field so that the movement of the filter elements when they are initially charged can be restricted and the density of the filter layer can be increased. As a result, the ability of the filter elements to attract and trap the cruds, i.e., the filtration efficiency can be improved.

(II) When the filter elements are magnetized, the density of filter layer is increased because they magnetically attract each other and even when the depth of the filter-element layer is decreased because of the increase in density of the filter layer, the filter elements are naturally supplied from above so that the variation in density of the filtration layer can be avoided.

(III) When the permanent magnets are withdrawn downwardly from the filtration layer, the filter elements are de-magnetized and become free to move upward. Therefore, with the counter-flow type cleaning, the filter layer are fluidized so that the cleaning efficiency can be improved.

(IV) The permanent magnets are inserted into the housings made of a ferromagnetic material so that the leakage flux can be minimized and the positive de-magnetization of the filter elements is ensured. As a result, the filter elements can be easily removed from the filter main body.

(V) When the permanent magnets are not in use, they are withdrawn into the guide tubes made of a non-magnetic material so that the direct contact of the permanent magnets with ferromagnetic component parts can be avoided and consequently the de-magnetization of the permanent magnets can be minimized, whereby a useful life of the permanent magnets can be increased.

(VI) Partition means which defines a plurality of sections and a plurality of vertical passages is disposed above the filtration layer so that a liquid to be treated can be streamlined and the filter elements can be prevented from being scattered when they are fluidized. As a result, the variation in thickness or density of the filtration layer due to the scattering of filter elements can be avoided.

(VII) When the depth of the filtration layer is substantially equal to the length of the permanent magnets, the required quantity of filter elements can be decreased.

(VIII) Because of (VII), the fluid pressure loss can be minimized.

(IX) When the filter-element passage extends downwardly from the lower end of the funnel-shaped portion of the screen nozzle of the screen main body, the movement of the magnetized filter elements can be positively restricted.

(X) When the side wall of the screen nozzle is formed with slits, the discharge of the treated liquid free from cruds is facilitated and the capacity of flow rate is increased.

What is claimed is:

1. A magnetic filter comprising a vessel, a screen main body disposed within the vessel for partitioning said vessel into an upper chamber in communication with an inlet for a liquid to be treated and a lower chamber in communication with a liquid outlet, caps made of a non-magnetic material and extending upwardly through said screen main body, filter elements which form a filtration layer when magnetized, said filter elements being piled up on said screen main body, and a vertically movable permanent magnet disposed below each of said caps such that when said permanent magnet is inserted into said cap with its upper magnetic pole being slightly higher than an undersurface of said screen main body, said filter elements are magnetized and their downward movement is restricted, but when said upper magnetic pole of said permanent magnet is withdrawn out of said cap, movement of said filter elements is freed, and a rake device disposed above said caps for smoothing an upper surface of said layer of said filter elements.

2. A magnetic filter according to claim 1 wherein disposed in said screen main body between the adjaent caps is a screen nozzle comprising a funnel-shaped portion, a passage extending downwardly from a lower end of said funnel-shaped portion and a side wall extending upwardly from an upper end of said funnel-shaped portion and formed with slits or holes, said slits or holes being communicated with said lower chamber of said vessel and of a size such that passage of said filter elements through said slits or holes is prohibited.

3. A magnetic filter according to claim 2 wherein disposed below each of the screen nozzles is a guide tube made of a non-magnetic material and surrounding the permanent magnet and a housing made of a ferromagnetic material and surrounding said guide tube so as to establish a magnetic path.

* * * * *